United States Patent [19]

Vucich

[11] 4,303,156

[45] Dec. 1, 1981

[54] ADJUSTABLE INCLINED CALCULATOR STAND

[76] Inventor: David J. Vucich, 2117 44th St., Highland, Ind. 46322

[21] Appl. No.: 175,387

[22] Filed: Aug. 5, 1980

Related U.S. Application Data

[63] Continuation of Ser. No. 707,822, Jul. 22, 1976, abandoned.

[51] Int. Cl.³ .................... F16M 15/00; B65D 85/38
[52] U.S. Cl. .................................. 206/305; 248/664

[58] Field of Search ............... 206/44 R, 45.14–45.15, 206/45.18–45.19, 45.2, 45.23, 305, 371, 557, 565; 211/175, 176, 43; 248/183, 447, 454, 456, 646, 664, 676

[56] References Cited

U.S. PATENT DOCUMENTS

| 1,651,523 | 12/1927 | Hamlin | 248/454 |
| 1,953,527 | 4/1934 | Bentley | 248/456 |
| 3,259,748 | 7/1966 | Lammers | 206/45.18 |
| 4,044,980 | 8/1937 | Cummins | 248/456 |

Primary Examiner—Stephen Marcus
Attorney, Agent, or Firm—Sabin C. Bronson

[57] ABSTRACT

A holder for a hand-type calculator constructed and arranged selectively to afford a plurality of angles of elevation.

10 Claims, 12 Drawing Figures

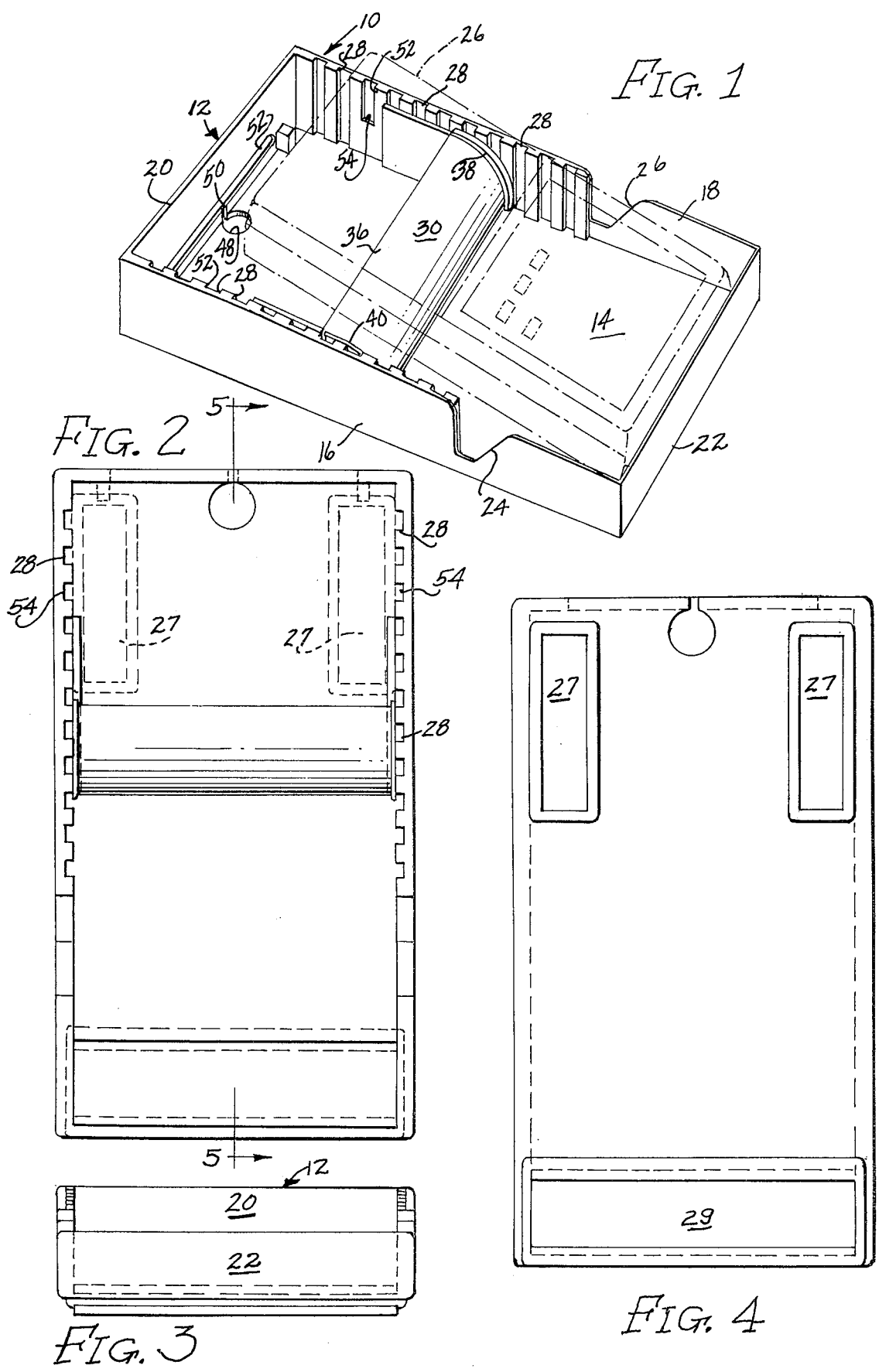

ADJUSTABLE INCLINED CALCULATOR STAND

RELATED APPLICATION

This is a continuation of application Ser. No. 707,822, filed July 22, 1976, now abandoned.

BACKGROUND AND SUMMARY OF THE INVENTION

A holder for a hand-type calculator in which a rectangular casing has a plurality of vertically disposed slots for selectively positioning a support standard in one position for supporting the upper end of the calculator in relatively low range of angular positions and in another position for supporting the calculator in a higher range of angular attitudes. Also, the standard has a sharp edge which affords an additional lower range of higher value angles. Furthermore, the invention contemplates the provision of a step in one or more of the slots to afford different higher calculator angles depending upon the relative position of the standard with respect to the base of the calculator. It is also contemplated that the casing be apertured for convenient passage of the calculator cord. In one form of the invention an elongated slot is provided in one end wall in spaced relation to the bottom wall of the casing to afford movement of the cord with respect to the casing and hold the cord in safe position. In one form a circular opening is formed in the bottom wall and communicates with the slot in the end wall. In another form of the invention the slot in the end wall extends to the top edge of the bottom wall, is covered by an integrally formed stub wall extending a limited extent away from the bottom wall and across the longitudinal direction of the slot.

BRIEF DESCRIPTION OF THE DRAWINGS

FIG. 1 is a view in perspective of the calculator holder of the present invention showing the calculator in dot and dash lines and showing the standard in the horizontal position with respect to the casing;

FIG. 2 is a plan view, on an enlarged scale, of the calculator stand of FIG. 1;

FIG. 3 is an end view of the calculator stand of FIG. 2 as viewed from the bottom of FIG. 2;

FIG. 4 is a bottom view of the calculator stand;

DESCRIPTION OF THE PREFERRED EMBODIMENTS

Figure 5:
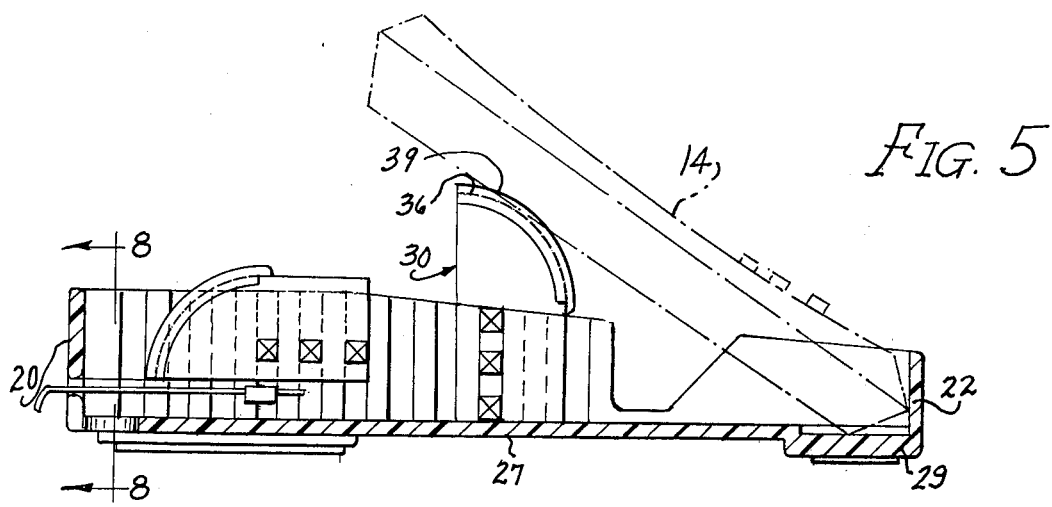
FIG. 5 is a reduced elevational sectional view of the calculator stand of the present invention taken substantially on line 5—5 of FIG. 2.

Referring now to the drawings and more particularly to FIG. 1, the calculator holder of the present invention is indicated generally by reference numeral 10 and includes a casing 12 having a bottom wall 14, and opposed side walls 16 and 18, and end walls 20 and 22. The end wall 22, as shown best in FIGS. 1 and 5, is shorter than end wall 20. The side walls 16 and 18 are provided with recesses 24 and 26, respectively, to afford a hand-hold for a calculator indicated by reference numeral 27 and shown in dot and dash lines. The recesses 24 or 26 may also receive an electric cord for a calculator having a socket on one of its sides. At the bottom of the bottom wall 14, preferably integrally formed, are a plurality of feet 27 and 29, as seen in FIG. 4.

Figure 6:
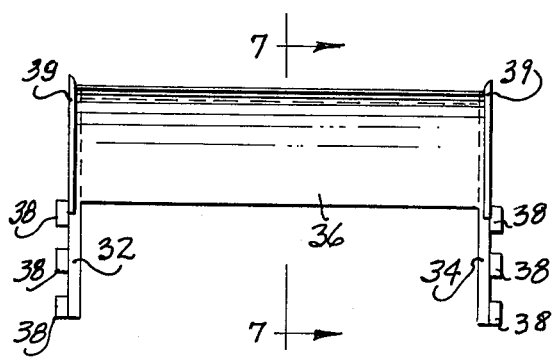
FIG. 6 is an elevational view of the standard illustrated in reclining position in FIG. 5.
Figure 7:
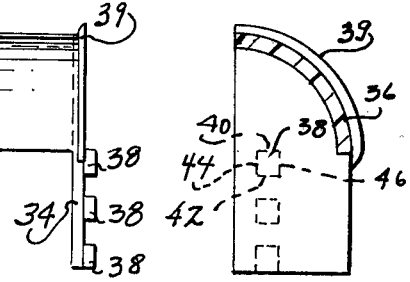
FIG. 7 is an elevational sectional view taken on line 7—7 of FIG. 6.
Figure 7A:
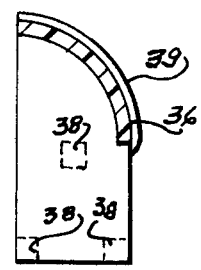
FIG. 7a is a view similar to FIG. 7 but illustrates a modified form of standard.
Figure 8:
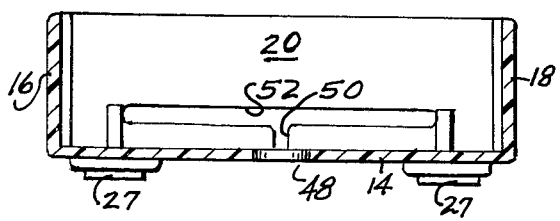
FIG. 8 is an elevational sectional view taken substantially on line 8—8 of FIG. 5.

Formed on the interior surfaces of side walls 16 and 18 are a plurality of slots 28. A standard 30, shown in FIG. 6 in the horizontal position, is provided with end panels 32 and 34 each of which has an arcuate upper edge for reception of a curved panel 36. Arcuately formed strips 39 are mounted on the side edges of the panel 36. Referring now to FIGS. 6 and 7, each of the panels 32 and 34 has on the outer surface thereof a plurality of aligned lugs 38. Referring now to FIG. 7, each of the lugs 38 is preferably square in configuration and has opposed side walls 40 and 42 and opposed side walls 44 and 46. The lugs 38 are adapted to be received in slots 28. In the horizontal position of the standard 30 the side edges 40 and 42 of lug 38 are in contact with the side edges of the respective slots 28. When the standard 30 is vertically positioned as illustrated in FIG. 7, the sides 44 and 46 (FIGS. 5 and 7) are in contact with the side edges of the slots 28. Thus, it will be apparent that the lugs are capable of firmly positioning the standard 30 in either a horizontal position or the vertical position for support of the calculator 27 in any one of a plurality of angular positions. In the vertical position, all three aligned lugs 38 would be received in one pair of opposed slots 28. In the horizontal position, the several aligned lugs 38 would be received in three adjacent opposed pairs of slots 28.

According to the present invention, means are provided for accommodating an electrical cord for using the calculator with conventional A. C. current. To this end, there is formed in the bottom wall 14 an opening 48 connected by a slot 50 in end wall 20 to an elongated slot 52 in the end wall 20 extending longitudinally to the end wall 20 in limited spaced relation to the bottom wall 14. The cord plug is initially passed upwardly through opening 48. The cord is then passed through slot 50 into slot 52, thus locking the plug within the casing. The casing 12 may be of any material such as plastic or the like, the slots 28 are preferably integrally formed in the side walls 16 and 18. In addition, the side walls 16 and 18 may have a short slot 53, formed above a stop 54, to hold the standard 30 above the bottom wall 14 by positioning the standard horizontally with the top most lugs 38 held by the short slot as illustrated in FIG. 5. This arrangement provides space below the standard for the electric cord and plug while limiting the distance by which the standard projects above the casing. If desired the standard 30 may be supported in storage position by integrally formed lugs 39. The calculator, then, whether or not the cord is connected to it, can be stored flat within the casing which then may have a lid (not shown) the sides of which would extend down to meet the tops or sides of the four walls, 16, 18, 20 and 22.

An inverted horizontal position of the standard next to the back wall 20 with the panel 36 facing the back wall and the bottom wall 14 provides the lowest possible height of the calculator stand while still being able to store the calculator flat. This position can be used for transporting the calculator stand and calculator together, as in a briefcase.

Two additional storage positions of the standard while storing the calculator flat in the holder are vertical forwards and vertical backwards in the two sets of slots next to the back wall 20.

It will be appreciated that with the standard in the position illustrated in FIG. 1 a plurality of confronting pairs of slots 28 may be selected to afford a plurality of low range angular positions for the calculator 27. A higher range of angular positions is obtained by disposing the standard 30 in a vertical position with respect to the casing 12, the panel 36 facing end wall 22, as illustrated in FIG. 5. As pointed out above the lugs 38 would all be disposed within one pair of confronting slots 28. Merely reversing the standard 30 end for end brings the sharp upper edge of the standard into confronting relation to the end wall 22 to provide a series of angles of greater value.

Figure 9:
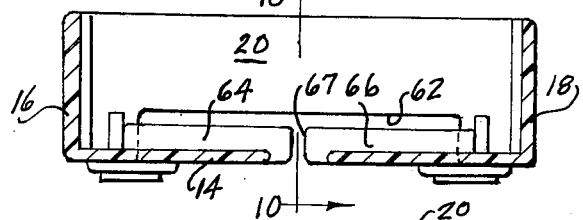
FIG. 9 is an elevational sectional view similar to FIG. 8 but showing a modified form of the present invention.
Figure 10:
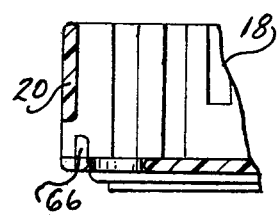
FIG. 10 is an elevational sectional view taken substantially on line 10—10 of FIG. 9.
Figure 9A:
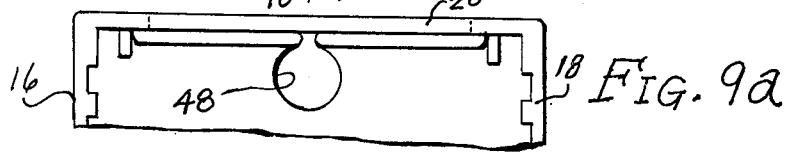
FIG. 9a is a fragmentary planned view of the form of the invention illustration in FIG. 9.

In FIG. 9 is shown a modified form of the present invention in which an elongated slot 62 is provided in lieu of the slot 52 of the principal form of the invention. The slot 62 extends all the way to the top surface of the bottom wall 14. A pair of stub walls 64 and 66 are integrally formed with the inner surface of the bottom wall 14 in the manner illustrated in FIG. 9 to reduce the dimensions of slot 62 to approximately that of the slot 52. These stub walls 64 and 66 are spaced from side to side in the slot 62 as desired. Desirably the plug is initially passed through the opening 48, the cord is then passed through the opening 67 and then the cord is brought into the slot 62. Thus, the plug is locked within the casing and will not fall out of the casing when disconnected from the calculator.

The calculator holder of the present invention exhibits important advantages over holders of the prior art. For example, the present holder is capable of supporting a calculator in a plurality of angles to suit the desires of the user. The holder may be the shipping package for the calculator with the standard 30 positioned adjacent to the end wall 20 with the panel 36 extending between the end wall 20 and the bottom wall 14. The arrangement of the lugs 38 enables their use either to position the standard vertically or horizontally. When in the vertical position the standard may be positioned with the curved edge facing the end wall 22 or with the sharp edge facing the end wall 22 to afford a different range of angles.

I claim:

1. A holder for a hand-type calculator comprising a casing adapted to receive said calculator and having a bottom wall, a front wall, a back wall and opposed side walls, each said side wall having a plurality of recesses; and a standard removeably mountable in at least one of said recesses in each of said side walls (1) in at least one horizontal position to support said calculator in a low angular attitude and (2) in at least one vertical position to support said calculator in a higher angular attitude.

2. The holder of claim 1 wherein said standard is removeably mountable (1) in a plurality of longitudinally spaced horizontal positions to support said calculator in a low range of angular attitudes and (2) in a plurality of longitudinally spaced vertical positions to support said calculator in a higher range of angular attitudes.

3. A holder in accordance with claim 1 wherein an opening is provided in said casing to afford ingress and egress for the electrical cord of the calculator.

4. A holder in accordance with claim 3 wherein said opening is constructed and arranged to accommodate an electrical cord extending from the bottom or the back wall of the calculator.

5. A holder in accordance with claim 3 wherein said opening comprises an elongated slot in said back wall in limited spaced relation to said bottom wall abutting said back wall and a slot connecting said first slot and said bottom opening.

6. The holder of claim 1 wherein each said recess comprises a vertical slot formed in said side wall, and said standard has opposing end elements each of which has one or more lugs capable of being received by at least one of said slots to thereby removeably mount said standard.

7. A holder in accordance with claim 6 wherein said lugs are adapted to be snugly received in said slots in such a way that said standard may be mounted vertically or horizontally with respect to said casing.

8. A holder in accordance with claim 7 wherein a step is provided in each of opposed slots to receive said standard in spaced parallel relation to said bottom wall.

9. A holder in accordance with claim 7 wherein an opening is formed in said bottom wall adjacent said back wall, a slot is formed in said back wall adjacent said bottom wall and a second slot connects said bottom opening and said first slot whereby an electrical cord plug may be received in said bottom opening and the cord then passed through said second slot into said final slot, thereby locking said cord in said casing.

10. The holder of claim 1 wherein said standard includes a surface having opposing side edges and being capable of supporting said calculator in an angular attitude and arcuately formed strips are mounted on the side edges of said surface.

* * * * *